Feb. 12, 1924.
LE ROY W. ROLLINS
1,483,113
HEEL TRIMMING MACHINE
Filed Dec. 1, 1921
2 Sheets-Sheet 1
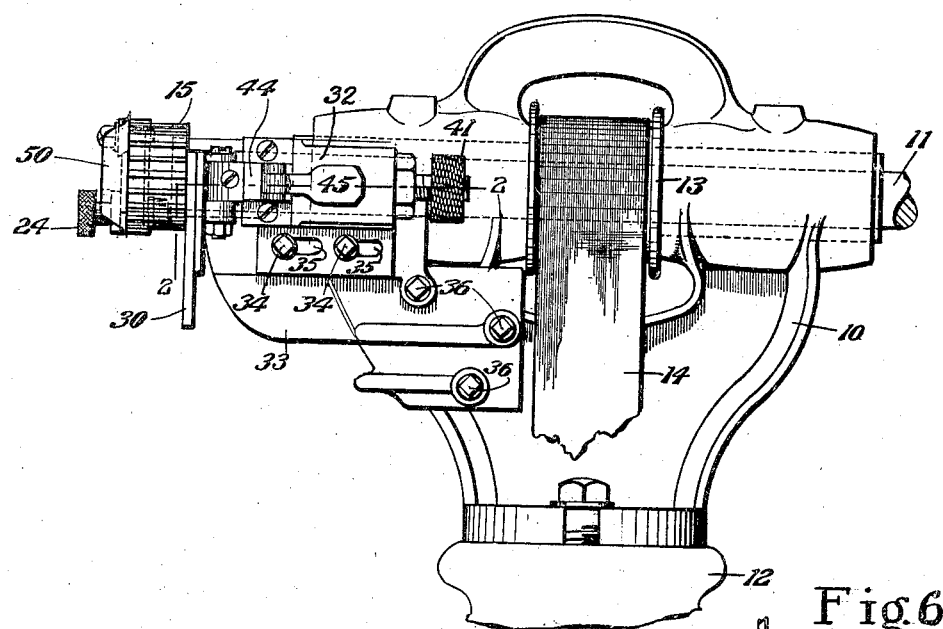
Fig.1.
Fig.6.
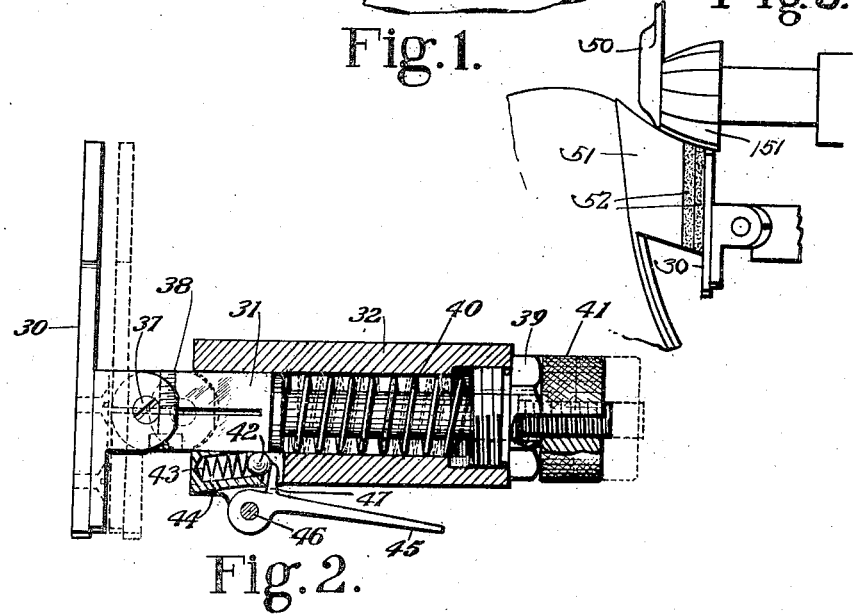
Fig.2.
INVENTOR
LeRoy W. Rollins
By his Attorney
Nelson W. Howard Feb. 12, 1924.  
LE ROY W. ROLLINS  
HEEL TRIMMING MACHINE  
Filed Dec. 1, 1921  
1,483,113  
2 Sheets-Sheet 2

INVENTOR  
LeRoy W. Rollins

Patented Feb. 12, 1924.

1,483,113

UNITED STATES PATENT OFFICE.

LE ROY W. ROLLINS, OF MEDFORD, MASSACHUSETTS, ASSIGNOR TO UNITED SHOE MACHINERY CORPORATION, OF PATERSON, NEW JERSEY, A CORPORATION OF NEW JERSEY.

HEEL-TRIMMING MACHINE.

Application filed December 1, 1921. Serial No. 519,138.

*To all whom it may concern:*

Be it known that I, LE ROY W. ROLLINS, a citizen of the United States, residing at Medford, in the county of Middlesex and State of Massachusetts, have invented certain Improvements in Heel-Trimming Machines, of which the following description, in connection with the accompanying drawings, is a specification, like reference characters on the drawings indicating like parts in the several figures.

This invention relates to heel-trimming machines and more especially to those used in shoe repair shops. Heel-trimming machines as designed for the manufacture of new shoes have been tried in shoe repair shops but have been discarded because they do not satisfy the conditions incidental to repair work. Consequently the practice commonly followed in repair shops, both for trimming one or more new lifts that have been applied to an old heel base to replace worn lifts, and also when trimming an entirely new heel, is to do the shaping more or less inaccurately with a hand-shave and thereafter finish the shaping with a scouring machine. This consumes a relatively great length of time in the hand-shaving and also in the scouring but is preferable to using a regular heel-trimming machine because the use of such machine would necessitate an abnormally great variety of trimming knives and changing the knives for every pair of heels to be trimmed, since there is no uniformity as to the shape of heels as handled in repair shops.

Furthermore, in repairing heels having curved profiles it has heretofore been difficult to shape the new portion of the heel so that it will merge smoothly with the base or remainder of the original heel. When it has been attempted to do this with machines as heretofore equipped it has been necessary to use trimming knives shaped precisely like those that were used to trim the original heel. This also requires too great a variety of trimming knives and involves excessive waste of time, first in selecting for each pair of heels knives having the necessary profile, and second in substituting them for the knives previously used and adjusting them (two being the usual number carried by a cutter-head) so that they will trim uniformly.

In view of the foregoing and other considerations an object of the present invention is to provide an improved heel-trimming machine by which new heels and repaired heels may be trimmed more satisfactorily and more easily than heretofore, and by which the number and variety of trimming cutters required may be reduced without sacrificing anything from the quality or variety of the work to be done. Stated in another way, a purpose of the invention is to provide an improved trimming machine which, with a relatively small variety of trimming cutters, will satisfy the requirements of the repair trade in regard to trimming repaired heels and entirely new heels.

By virtue of the present invention three different trimming cutters, viz, one having a straight profile for men's work, one slightly curved to form a concave profile on women's low and medium heels, and one having a profile suitable for French heels, will take care of all the heel-trimming ordinarily required of a shoe repair shop.

So far as the invention deals with reproducing original profiles from a small variety of cutters it includes a tread-rest capable of certain adjustments and formed to cover more or less of the cutter, so as to expose only that part of the cutter than will conform to the desired profile.

Another purpose of the invention is to insure uniformity of trimming with respect to both heels of a pair of shoes. In this respect a feature of the invention consists in novel means for controlling the tread-rest with respect to its adjustment, so that such adjustment may not only be quickly determined for the first heel of a pair, but will be maintained for the mate of that pair.

Still another object is to provide a guard that will function in the rand crease when trimming an entirely new heel and that will also function on the periphery of the original heel base when it is desired to trim one or more new lifts that have been attached thereto to replace worn lifts.

Other objects are hereinafter set forth, and other novel features are hereinafter claimed and illustrated by the accompanying drawings.

Referring to the drawings,

Fig. 1 is a front elevation of a heel-trimming machine embodying the present invention in what is now regarded as the preferred construction, the working head of the machine being represented as attached to a fragment of a supporting column or standard;

Fig. 2, on a larger scale, is a sectional view of the tread-rest in a horizontal plane indicated by broken line 2—2 of Fig. 1;

Fig. 6 is an elevation of a trimming cutter having a convex contour; and

Figure 3:
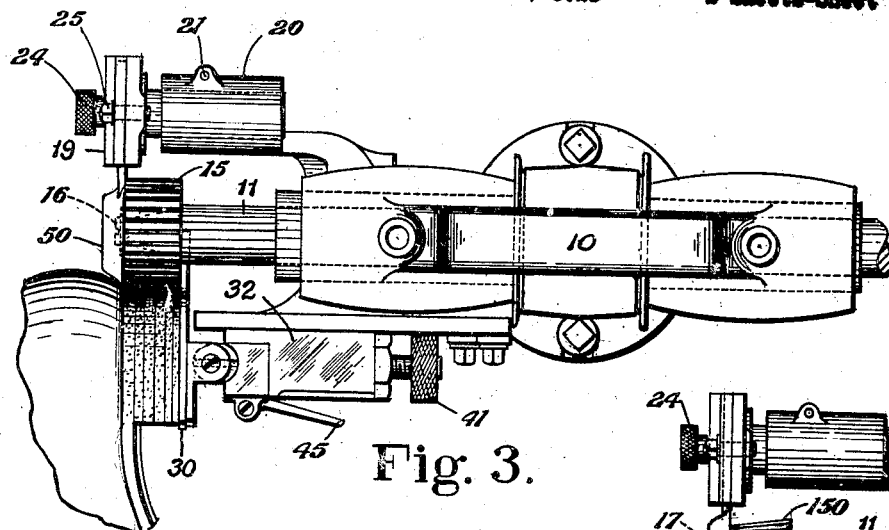
Fig. 3 is a top plan view in which the machine is equipped and adjusted to trim an entirely new heel.

The illustrated machine comprises a head 10 having journals for a cutter shaft 11. The head is secured to a column or standard 12. A pulley 13, fastened to the shaft, receives rotation from a belt 14. The left-hand end of the shaft is formed as usual to carry a trimming cutter such as that indicated at 15 or a cutter of any other desired profile. The cutters are interchangeable for heels of different styles, and are fastened to the shaft by a screw 16 and washer 17.

Figure 5:
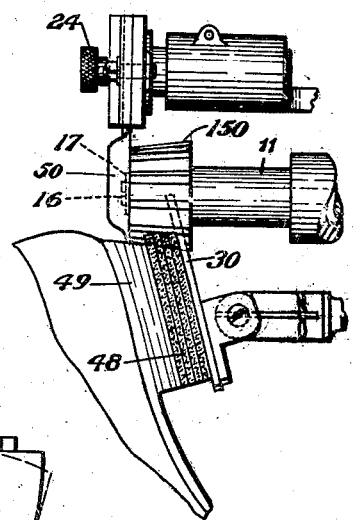
Fig. 5 is a top plan view similar to the left-hand portion of Fig. 3 excepting that a tapered cutter is substituted and the parts are adjusted to perform a different operation.
Figures 4, 7:
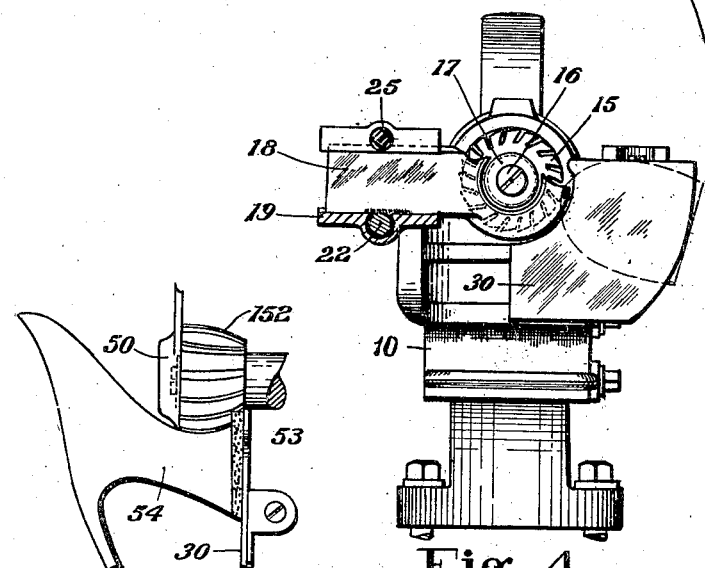
Fig. 4 is an end elevation of the machine as viewed from left to right with reference to Figs. 1 and 3.
Fig. 7 is an elevation including a French heel, the tread-rest, and a trimming cutter suitably shaped to trim a new toplift with which the heel has been provided.

A counter guard 50, sometimes called a rand-crease guard, is arranged in contiguous relation to the left-hand end of the cutter and is dished to receive and clear the washer 17 and the head of the screw 16. The rim of this guard is formed to enter the rand crease when the machine is used to trim an entirely new heel as shown by Fig. 3, but is also adapted to cooperate with the base of an original heel when one or more new lifts have been attached to replace worn lifts as shown by Fig. 5. The counter guard has a shank portion 18 arranged to slide, for purposes of adjustment, in grooved guides formed in a holder 19 (see Fig. 4). A shank formed on the holder 19 is adjustably secured in a split clamping boss 20 formed on a stationary bracket. The boss is provided with a clamping screw 21 by which it may be contracted to clamp the shank of the holder in any desired position, the shank being cylindric and adjustable axially and rotatively. An adjusting pinion 22 carried by the holder 19 engages rack teeth 23 formed on the shank 18 of the counter guard for the purpose of adjusting the latter transversely of the axis of the cutter, said pinion being provided with any suitable means such as a nurled head 24 by which to turn it. As shown by Figs. 3 and 4, the upper guide for the shank 18 is split and is provided with a clamping screw 25 by which it may be tightened to secure the counter guard in various positions of adjustment.

A tread-rest comprising a tread plate 30 and a shank 31 is adjustably mounted to slide in a stationary block 32. This block is adjustably secured to a bracket 33 by clamping bolts 34, the block having slots 35 extending parallel to the cutter shaft so that the block may be adjusted along lines parallel to the axis of the shaft. The bracket 33 is fastened to the head 10 by bolts 36.

The tread plate 30 and its shank 31 are preferably made in two pieces and connected by a pivot stud 37 as shown by Fig. 2, to enable the plate to turn to various positions as required by the style of heel to be trimmed. The shank is split so as to be capable of clamping the stud 37, and is provided with a clamping screw 38 by which its hold on the stud may be tightened as little or as much as desired. When the parts are assembled the stud 37 is, to all intents and purposes, an integral part of the plate 30 so that the plate will not turn relatively thereto. In practice it is preferable to tighten the split portion of the shank 31 enough to prevent angular motion of the tread plate when the latter is functioning, but not enough to prevent the operative from changing its angular position by taking hold of it and turning it intentionally. The tread plate thus serves to determine the angle at which the tread surface of the heel will stand during the trimming operation, although it serves other purposes hereinafter explained.

The left-hand portion of the shank 31, referring to Fig. 2, is preferably rectangular in cross-section to prevent the tread-rest from turning about the axis of the shank, and the bearing in which it slides is, of course, correspondingly shaped. The right-hand portion of the shank is cylindric and is arranged to slide in a bushing 39 screwed into the block 32. A helical compression spring 40 acts on the shank to urge the tread-rest normally toward the field of the work, the extent of sliding movement being limited by a finger nut 41 screwed on the right-hand end of the shank so as to abut against the outer end of the bushing. The tread-rest is provided with automatically operative means arranged normally to prevent it from moving away from the field of the work, said means being also operative automatically to sustain the rest against moving in the opposite direction under the influence of the spring 40. This automatically operative means, as shown by Fig.

2, consists in a well-known form of roller clutch arranged to act on the rectangular portion of the shank 31. The roller member of the clutch as shown is a ball 42 and is arranged in an inclined socket in a hardened steel block 44, said socket also containing a helical compression spring 43 by which the ball is normally maintained in operative position. By virtue of this arrangement it is impossible for the tread-rest to move from left to right when the ball is held in operative position by its spring 43, and consequently the rest can not recede under pressure exerted against it by the work. Furthermore, the slight inclination or pitch of the ball race enables the ball to exercise a frictional holding action sufficient to prevent the shank from moving from right to left under the influence of the spring 40. The tread-rest is, therefore, to all intents and purposes, locked against movement in both directions so long as the ball remains in operative position, and the only purpose of the spring 40 is to return it to its left-hand position when the retaining clutch is released as hereinafter explained.

A finger lever 45 is connected to the block 44 by a pivot member 46 and is provided with a lug 47 arranged to force the clutching ball away from its operative position so as to release the tread-rest.

When a trimming machine is equipped with a counter guard and a tread-rest embodying the construction herein disclosed four styles of cutters, as shown by the drawings, are sufficient to satisfy all requirements of the shoe-repairing trade. Three typical examples of work are illustrated to show various conditions met in such trade, and in each case the material to be trimmed is stippled to distinguish it from the previously trimmed material.

When trimming a new leather heel such as that shown in Fig. 3 the operative first turns the nurl 24 to adjust the counter guard so that it will project beyond the front of the cutter and enter the rand crease. Then, pressing the releasing lever 45 to release the tread-rest, he forces the latter back against the spring 40 by pressing the tread of the heel against the tread plate. The rand crease having been located in registration with the rim of the counter guard, he releases the lever 45 whereupon the tread-rest becomes locked automatically in the desired position. The shoe is then manipulated as any other shoe would be to trim a new heel. Cutters of the styles shown in Figs. 5 and 6 may be substituted according to the profile desired.

The heel shown by Fig. 5 differs from that shown in Fig. 3 in that its periphery is inclined relatively to the tread, and it has a plurality of new lifts 48 attached to the base 49 of the original heel. In this case it is necessary to trim only the new lifts, and the problem is to reproduce the shape of the original heel so as to merge the trimming of the new lifts with that of the original lifts. Accordingly the operative first substitutes the tapering cutter 150 and then swings the tread plate 30 to an angle such that the slant of the periphery of the base 49 will be parallel to that of the cutter. For trimming under these conditions the guard 50 is adjusted so that its work-engaging portion will be substantially flush with the periphery of the cutter. Then the tread-rest will be adjusted so that the guard 50 will bear on the periphery of the base 49. By keeping the tread of the heel seated on the plate 30, as shown, the new lifts will be trimmed flush relatively to the base 49 without trimming the latter, the tread-rest insuring the same slant as that previously given to the base 49. No change of adjustment is necessary after trimming the first heel of a pair to prepare the machine for trimming the mate, and the two heels constituting a pair will therefore be trimmed uniformly in every respect.

Fig. 6 shows a cutter 151 suitable for trimming a heel having a curved profile. This figure represents the heel as having its original base 51 and a plurality of new lifts 52. The procedure is similar to that described in connection with Fig. 5 excepting that the tread rest is adjusted to expose only that portion of the cutter that will reproduce the profile of the original heel. The desired position of the tread-rest may be obtained by first pressing back the lever 45 and then forcing back the tread-rest with the heel until the base 51 is located at a position where its profile is parallel to that of the cutter. If the tread-rest, under these conditions, is left in the same position for both heels of a pair the heels will be trimmed uniformly.

Fig. 7 shows a cutter 152 of a shape suitable to trim a new toplift attached to a French heel 53.

Having thus described my invention, what I claim as new and desire to secure by Letters Patent of the United States is:

1. A heel-trimming machine comprising a rotary trimming cutter, an adjustable tread-rest arranged to execute its adjusting movement along lines substantially perpendicular to its tread face, and a one-way clutch arranged normally to hold said tread-rest against movement in one direction along said lines.

2. A heel-trimming machine comprising a rotary trimming cutter, an adjustable tread-rest arranged to execute its adjusting movement along lines substantially perpendicular to its tread face, means arranged normally to hold said tread-rest against movement in one direction along said lines, and manually operable means arranged to act on said holding means to neutralize the holding effect thereof.

3. A heel-trimming machine comprising a rotary trimming cutter, an adjustable tread-rest, and a roller clutch arranged normally to hold said tread-rest against adjusting movement in one direction.

4. A heel-trimming machine comprising a rotary trimming cutter adapted to trim the periphery of the heel, an adjustable tread-rest arranged to have adjusting movement lengthwise of the axis of said cutter, and spring-stressed holding means arranged normally to act on said tread-rest to resist such adjusting movement of the latter in opposite directions.

5. A heel-trimming machine comprising a rotary trimming cutter, an adjustable tread-rest arranged to execute its adjusting movement along lines substantially perpendicular to its tread face, a spring arranged to urge said tread-rest along said lines toward the field of the work, and means arranged to act automatically to prevent movement of the tread-rest in one direction along said lines.

6. A heel-trimming machine comprising a rotary trimming cutter, an adjustable tread-rest arranged to execute its adjusting movement along lines substantially perpendicular to its tread face, a spring arranged to urge said tread-rest along said lines toward the field of the work, and frictional holding means arranged to hold said tread-rest against the stress of said spring.

7. A heel-trimming machine comprising a rotary trimming cutter, an adjustable tread-rest arranged to execute its adjusting movement along lines substantially perpendicular to its tread face, manually controllable and automatically operative means arranged normally to hold said tread-rest against movement in both directions along said lines, and a spring arranged to urge said tread-rest toward the field of the work.

8. A heel-trimming machine comprising a rotary trimming cutter, an adjustable tread-rest arranged to execute its adjusting movement along lines substantially perpendicular to its tread face, means arranged normally to hold said tread-rest frictionally against movement toward the field of the work and to hold it positively against movement in the opposite direction, a spring arranged to urge said tread-rest toward said field, and means for acting on said holding means so as to release the tread-rest.

9. A machine for trimming repair lifts attached to the base of a previously shaped heel, comprising a rotary trimming cutter, a guard arranged at one end of said cutter so as to engage the periphery of said heel base, a tread-rest movable along lines substantially perpendicular to its tread face, a spring arranged to urge said tread-rest toward the field of the work, and automatically operative means arranged to hold said tread-rest against movement along said lines, said holding means being manually controllable to release the tread-rest.

10. A heel-trimming machine, comprising a trimming cutter, a rand-crease guide, a tread-rest arranged to move along lines substantially perpendicular to its tread face, a spring arranged to urge said tread-rest toward the field of the work, and a manually releasable clutch arranged normally to hold said tread-rest against movement along said lines.

11. A heel-trimming machine, comprising a trimming cutter, a stationary guard arranged to limit the depth of trimming, a tread-rest, a carrier therefor, means forming a frictional pivot joint connecting said tread-rest and carrier so that said tread-rest may be tilted to various angles relatively to its carrier as required by the style of heel to be trimmed but not by ordinary working stresses, a spring arranged to urge said carrier toward the field of the work, and manually releasable means arranged normally to hold said carrier against movement.

12. A heel-trimming machine comprising a trimming cutter, an adjustable work-gage arranged in cooperative relation thereto, and means arranged to act automatically so as to hold said work-gage against adjusting movement but operable to release the work-gage.

13. A heel-trimming machine comprising trimming means, an adjustable work-gage arranged in cooperative relation thereto, a spring arranged normally to adjust said work-gage in one direction, and means arranged to act automatically so as to hold said work-gage against adjusting movement but operable manually to release the work-gage.

In testimony whereof I have signed my name to this specification.

LE ROY W. ROLLINS.